United States Patent
Zhao et al.

(10) Patent No.: US 9,439,118 B2
(45) Date of Patent: Sep. 6, 2016

(54) SYSTEMS AND METHODS SUPPORTING WLAN-WWAN MOBILITY IN DEVICES

(71) Applicant: QUALCOMM Incorporated, San Diego, CA (US)

(72) Inventors: Suli Zhao, San Diego, CA (US); Ajith Tom Payyappilly, San Diego, CA (US); Jeffrey Alan Dyck, San Diego, CA (US); Uppinder Singh Babbar, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 13/946,835

(22) Filed: Jul. 19, 2013

(65) Prior Publication Data

US 2014/0023041 A1   Jan. 23, 2014

Related U.S. Application Data

(60) Provisional application No. 61/674,799, filed on Jul. 23, 2012.

(51) Int. Cl.
*H04W 36/14* (2009.01)
*H04W 36/00* (2009.01)

(52) U.S. Cl.
CPC ......... *H04W 36/14* (2013.01); *H04W 36/0011* (2013.01)

(58) Field of Classification Search
None
See application file for complete search history.

(56) References Cited

U.S. PATENT DOCUMENTS

| | | | | |
|---|---|---|---|---|
| 7,613,150 B2 * | 11/2009 | Nagarajan et al. | ........... | 370/331 |
| 7,660,584 B2 * | 2/2010 | Maxwell | ........... | H04L 29/12047 370/331 |
| 8,140,079 B2 * | 3/2012 | Olson | ........... | 455/440 |
| 8,190,191 B2 | 5/2012 | Livet et al. | | |
| 8,254,294 B2 * | 8/2012 | Vesterinen | ........... | 370/259 |
| 8,315,626 B2 * | 11/2012 | Huotari et al. | ........... | 455/435.2 |
| 8,331,325 B2 * | 12/2012 | Wu | ........... | H04L 12/66 370/331 |
| 8,442,004 B2 * | 5/2013 | Bi et al. | ........... | 370/331 |
| 8,477,724 B2 * | 7/2013 | Bakker et al. | ........... | 370/331 |
| 8,565,766 B2 * | 10/2013 | Scherzer et al. | ........... | 455/435.2 |
| 8,625,530 B2 * | 1/2014 | Wu | ........... | H04L 12/66 370/331 |
| 8,743,828 B2 * | 6/2014 | Wang | ........... | H04W 36/0033 370/331 |
| 8,755,352 B2 * | 6/2014 | Rommer | ........... | H04W 36/0011 370/331 |
| 8,879,530 B2 * | 11/2014 | Gu | ........... | 370/338 |

(Continued)

OTHER PUBLICATIONS

International Search Report and Written Opinion—PCT/US2013/051465—ISA/EPO—Nov. 12, 2013.

(Continued)

*Primary Examiner* — Gregory Sefcheck
(74) *Attorney, Agent, or Firm* — Norton Rose Fulbright US LLP

(57) ABSTRACT

Systems and methods are disclosed for supporting, in a device, Wireless Local Area Network (WLAN)-Wireless Wide Area Network (WWAN) mobility, data offload, and simultaneous usage of different access networks on a per Access Point Name (APN) basis. The device determines an access network among WWAN and WLAN for a data stream having an APN. The device additionally hands off the data stream according to the determined access network, while maintaining Internet Protocol (IP) continuity. The device further routes packets of the data stream to at least one of a protocol stack or interface for the determined access network in accordance with an inter-system routing policy (ISRP).

28 Claims, 9 Drawing Sheets

(56) References Cited

U.S. PATENT DOCUMENTS

| | | | | |
|---|---|---|---|---|
| 8,885,626 B2* | 11/2014 | Gu | ........................... | 370/338 |
| 8,943,165 B2* | 1/2015 | Zhou et al. | .................... | 709/217 |
| 8,976,663 B2* | 3/2015 | Qiang | ........................... | 370/235 |
| 8,982,836 B2* | 3/2015 | Zhao et al. | .................... | 370/331 |
| 9,185,545 B2* | 11/2015 | Yeoum | .................... | H04W 8/082 |
| 9,282,487 B2* | 3/2016 | Sun | ........................ | H04L 45/38 |
| 9,319,938 B2* | 4/2016 | Sun | ........................ | H04W 28/10 |
| 2011/0002466 A1 | 1/2011 | Kwak et al. | | |
| 2011/0090794 A1 | 4/2011 | Cherian et al. | | |
| 2011/0116469 A1 | 5/2011 | Bi et al. | | |
| 2012/0026979 A1* | 2/2012 | Rommer | ........... | H04W 36/0011 370/331 |
| 2012/0069817 A1* | 3/2012 | Ling | .................... | H04W 36/14 370/331 |
| 2012/0307799 A1* | 12/2012 | Taleb | .................... | H04W 8/065 370/331 |
| 2013/0031271 A1 | 1/2013 | Bosch et al. | | |
| 2013/0089076 A1* | 4/2013 | Olvera-Hernandez | | H04W 36/08 370/332 |
| 2013/0308445 A1* | 11/2013 | Xiang et al. | .................... | 370/230 |
| 2014/0003322 A1* | 1/2014 | Grinshpun | ........... | H04W 36/026 370/312 |
| 2014/0036873 A1* | 2/2014 | Cheng | ............... | H04W 36/0022 370/331 |
| 2014/0079022 A1* | 3/2014 | Wang et al. | .................... | 370/331 |
| 2014/0161026 A1* | 6/2014 | Stojanovski | ........... | H04L 45/22 370/328 |
| 2015/0023277 A1* | 1/2015 | Kim | ...................... | H04W 36/14 370/329 |
| 2015/0215836 A1* | 7/2015 | Srivastava | ............ | H04W 36/22 370/331 |
| 2015/0319659 A1* | 11/2015 | Jung | .................... | H04W 48/18 370/331 |

OTHER PUBLICATIONS

Motorola Mobility et al., "Single IP Flow Transfer across Different 3GPP and non-3GPP Accesses", 3GPP Draft; S2-105591, Disc Single IP Flow on Multiple Accesses, 3rd Generation Partnership Project (3GPP), Mobile Competence Centre ; 650, Route Des Lucioles ; F-06921 Sophia-Antipolis Cedex ; France, vol. SA WG2, no. Jacksonville; 20101115, Nov. 9, 2010, XP050522961, [retrieved on Nov. 9, 2010].

Motorola Mobility et al., "Single IP Flow Transfer across Different 3GPP and non-3GPP Accesses", 3GPP TS 23.261 V10.2.0, 3GPP Draft; S2-105591, Disc Single IP Flow on Multiple Accesses, 3rd Generation partnership Project (3GPP), Mobile Competence Centre ; 650, Route des Lucioles ; F-06921 Sophia-Antipolis Cedex ; France, vol. SA WG2, no. Jacksonville; 20101115, Nov. 9, 2010, XP050522961, [retrieved on Nov. 9, 2010].

3GPP: "3rd Generation Partnership Project; Technical Specification Group Services and System Aspects; IP Flow Mobility and Seamless Wireless Local Area Network (WLAN) offload; Stage 2 (Release 10)", 3GPP Draft; 23261-A20_CR_IMPLEMENTED, 3rd Generation Partnership Project (3GPP), Mobile Competence Centre ; 650, Route des Lucioles ; F-06921 Sophia-Antipolis Cedex ; France, Mar. 14, 2012, XP050625435, [retrieved on Mar. 14, 2012].

\* cited by examiner

SYSTEMS AND METHODS SUPPORTING WLAN-WWAN MOBILITY IN DEVICES

CROSS-REFERENCE TO RELATED APPLICATIONS

This application claims the benefit of U.S. Provisional Patent Application No. 61/674,799, entitled, "SYSTEMS AND METHODS SUPPORTING WLAN-WWAN MOBILITY IN DEVICES", filed on Jul. 23, 2012, which is expressly incorporated by reference herein in its entirety.

BACKGROUND

1. Field

Aspects of the present disclosure relate generally to wireless communication systems, and more particularly, to methods and apparatus for supporting Wireless Local Area Network (WLAN)-Wireless Wide Area Network (WWAN) mobility in devices.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In 3GPP Release 10, simultaneous network connections to multiple radio access technologies were enabled by Multi Access Packet Data Network Connectivity (MAPCON), General Packet Radio Service (GPRS) Protocol Tunnel (GPT), and non-seamless Wi-Fi offload. To take these capabilities into account, the Access Network Discovery and Selection Function (ANDSF) framework was enhanced with the introduction of Inter System Routing Policies (ISRP), allowing the operator to provide policies based on the traffic exchanged by the User Equipment (UE). In this way, the operator can indicate preferred or forbidden radio access technologies as a function of the type of traffic the UE sends. Specifically an ISRP can be based on: (a) the Packet Data Network (PDN) identifier, such as Access Point Name (APN), that the UE uses for a given connection; (b) the destination IP address to which the UE sends traffic; (c) the destination port number to which the UE connects; or (d) a combination of the above three elements. However, solutions for supporting Wireless Local Area Network (WLAN)-Wireless Wide Area Network (WWAN) mobility on devices, such as UEs, remain as yet undeveloped.

SUMMARY

Techniques for supporting WLAN-WWAN mobility in devices are described herein.

In an aspect, a method is disclosed for supporting, in a device, Wireless Local Area Network (WLAN)-Wireless Wide Area Network (WWAN) mobility, data offload, and simultaneous usage of different access networks on a per Access Point Name (APN) basis. The method includes determining, by the device, an access network among WWAN and WLAN for a data stream having an APN. The method also includes handing off the data stream, by the device, according to the determined access network, while maintaining Internet Protocol (IP) continuity. The method further includes routing packets of the data stream, by the device, to at least one of a protocol stack or interface for the determined access network in accordance with an inter-system routing policy (ISRP).

In another aspect, an apparatus is disclosed for supporting in a device, Wireless Local Area Network (WLAN)-Wireless Wide Area Network (WWAN) mobility, data offload, and simultaneous usage of different access networks on a per Access Point Name (APN) basis. The apparatus includes means for determining, by the device, an access network among WWAN and WLAN for a data stream having an APN. The apparatus also includes means for handing off the data stream, by the device, according to the determined access network while maintaining Internet Protocol (IP) continuity. The apparatus further includes means for routing packets of the data stream, by the device, to at least one of a protocol stack or interface for the determined access network in accordance with an inter-system routing policy (ISRP).

In an additional aspect, a computer program product is disclosed for supporting, in a device, Wireless Local Area Network (WLAN)-Wireless Wide Area Network (WWAN) mobility, data offload, and simultaneous usage of different access networks on a per Access Point Name (APN) basis. The computer program product includes a non-transitory computer-readable medium including code for determining, by the device, an access network among WWAN and WLAN for a data stream having an APN. Additional code of the non-transitory computer-readable medium includes code for handing off the data stream, by the device, according to the determined access network, while maintaining Internet Protocol (IP) continuity. Further code of the non-transitory computer-readable medium includes code for routing packets of the data stream, by the device, to at least one of a protocol stack or interface for the determined access network in accordance with an inter-system routing policy (ISRP).

In a further aspect, a user equipment (UE) is disclosed that is capable of supporting Wireless Local Area Network (WLAN)-Wireless Wide Area Network (WWAN) mobility, data offload, and simultaneous usage of different access networks on a per Access Point Name (APN) basis. The UE includes at least one processor and a memory coupled to the at least one processor. The at least one processor is configured to determine an access network among WWAN and. WLAN for a data stream having an APN, and hand off the data stream according to the determined access network while maintaining Internet Protocol (IP) continuity. The at least one processor is further configured to route packets of the data stream to at least one of a protocol stack or interface for the determined access network in accordance with an inter-system routing policy.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
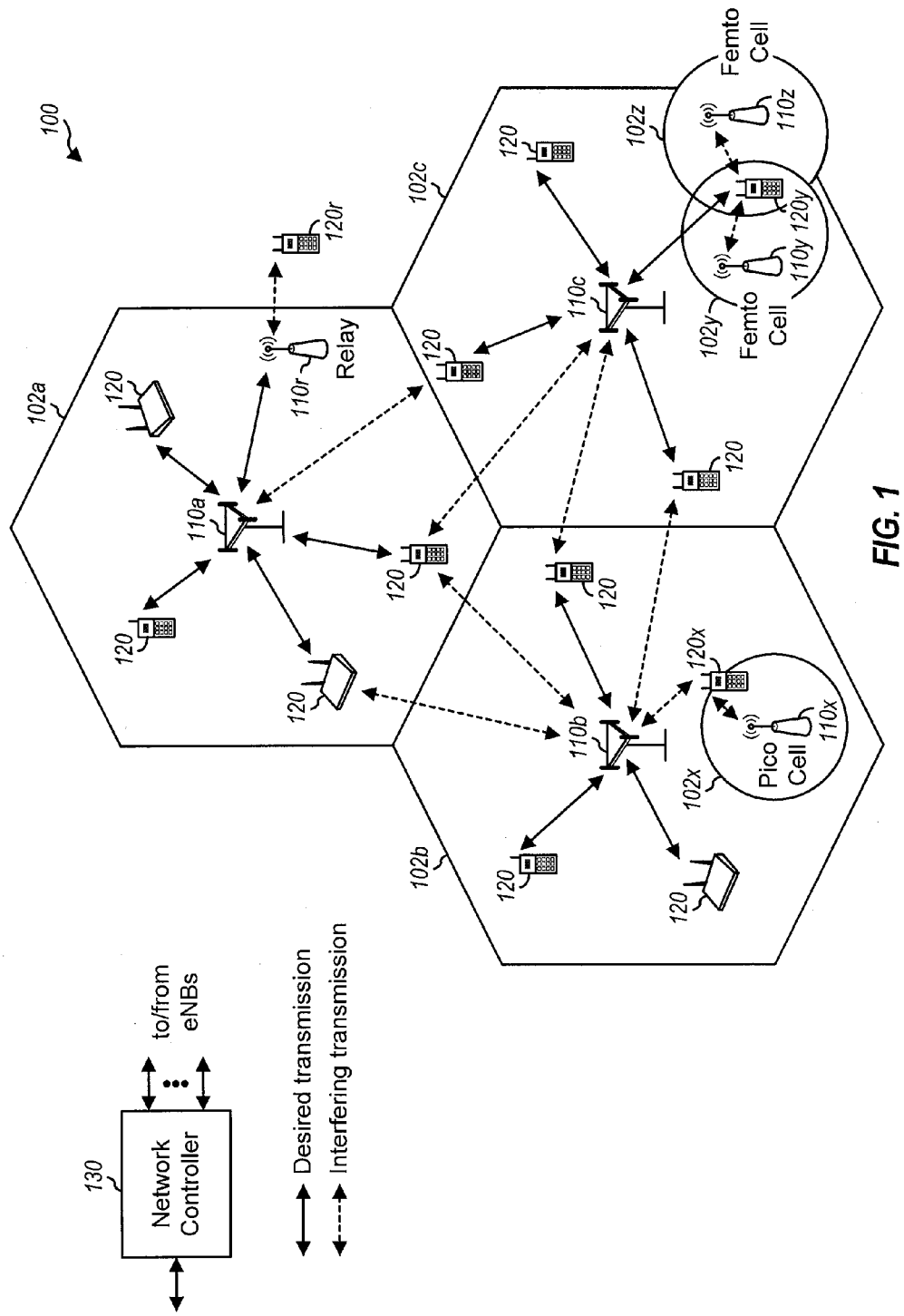
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs.

The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.4, 3, 5, 10 or 20 MHz, respectively.

Figure 2:
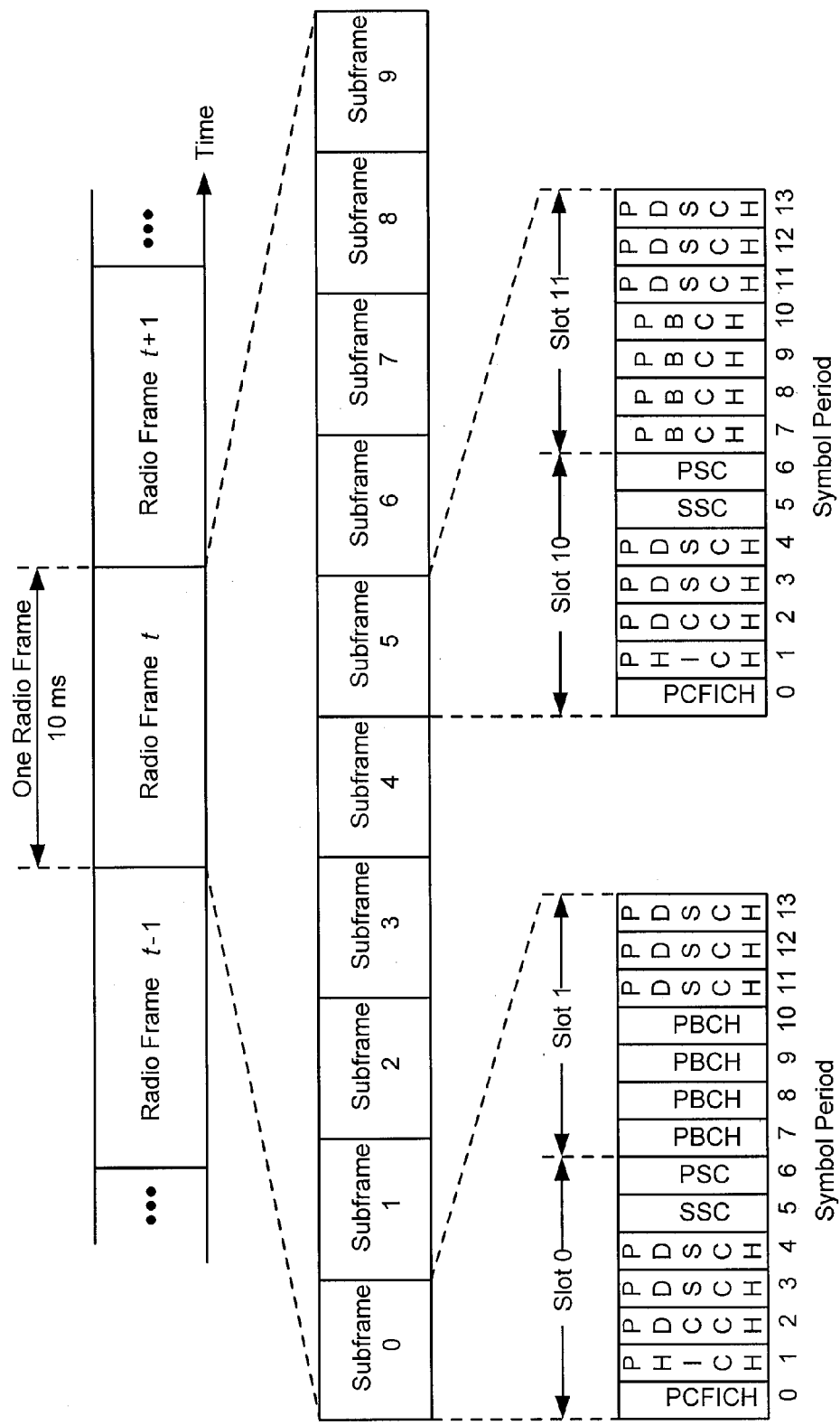
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
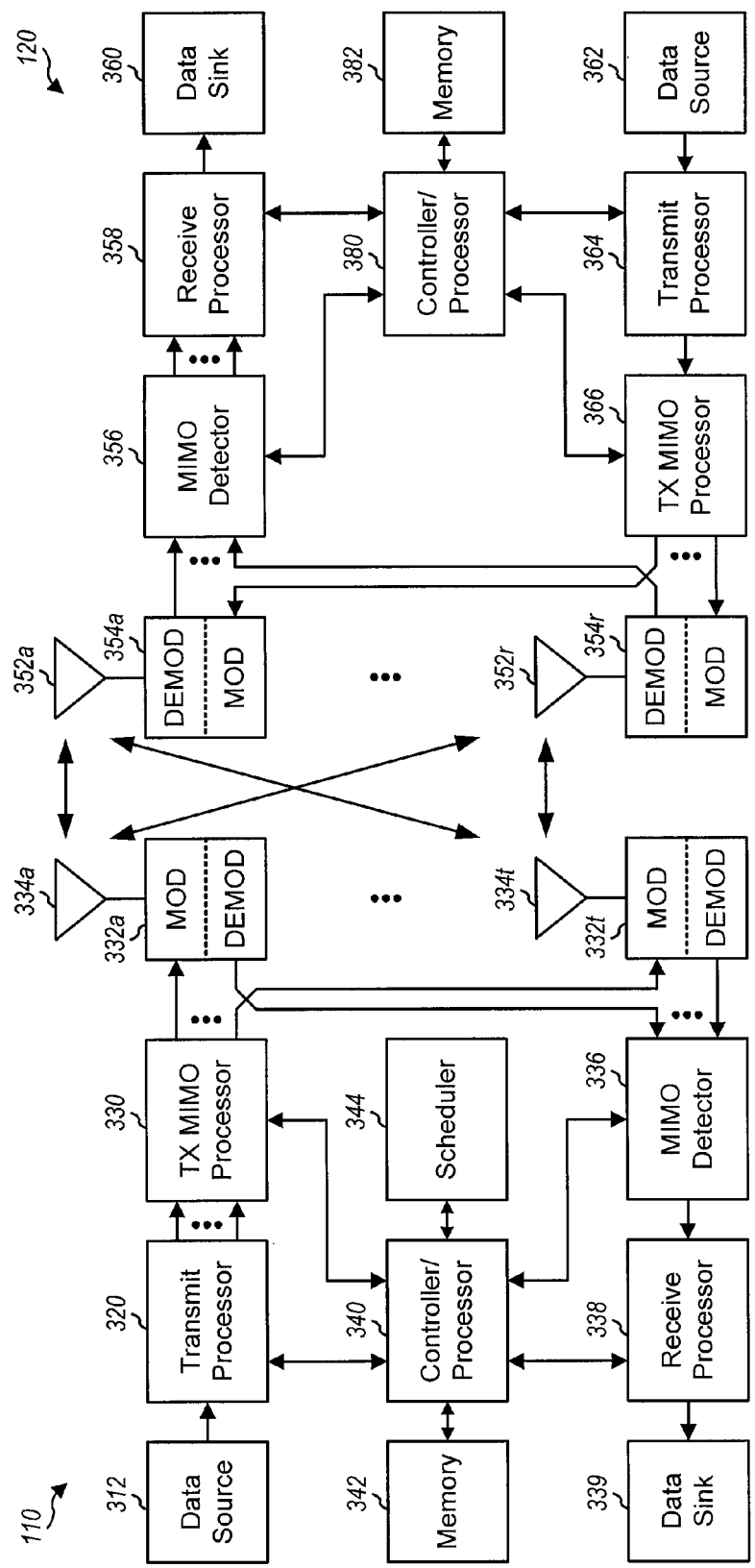
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 5-9, and/or other processes for the techniques described herein. The memories 342 and 382 may store data and program codes for the eNodeB 110 and the UE 120, respectively. A scheduler 344 may schedule UEs for data transmission on the downlink and/or uplink.

In one configuration, the UE 120 for wireless communication includes means for determining an access network among WWAN and WLAN for a data stream having an APN, means for handing off the data stream according to the determined access network while maintaining Internet Protocol (IP) continuity, and means for routing packets of the data stream to at least one of a protocol stack or interface for the determined access network in accordance with an inter-system routing policy(ISRP). In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
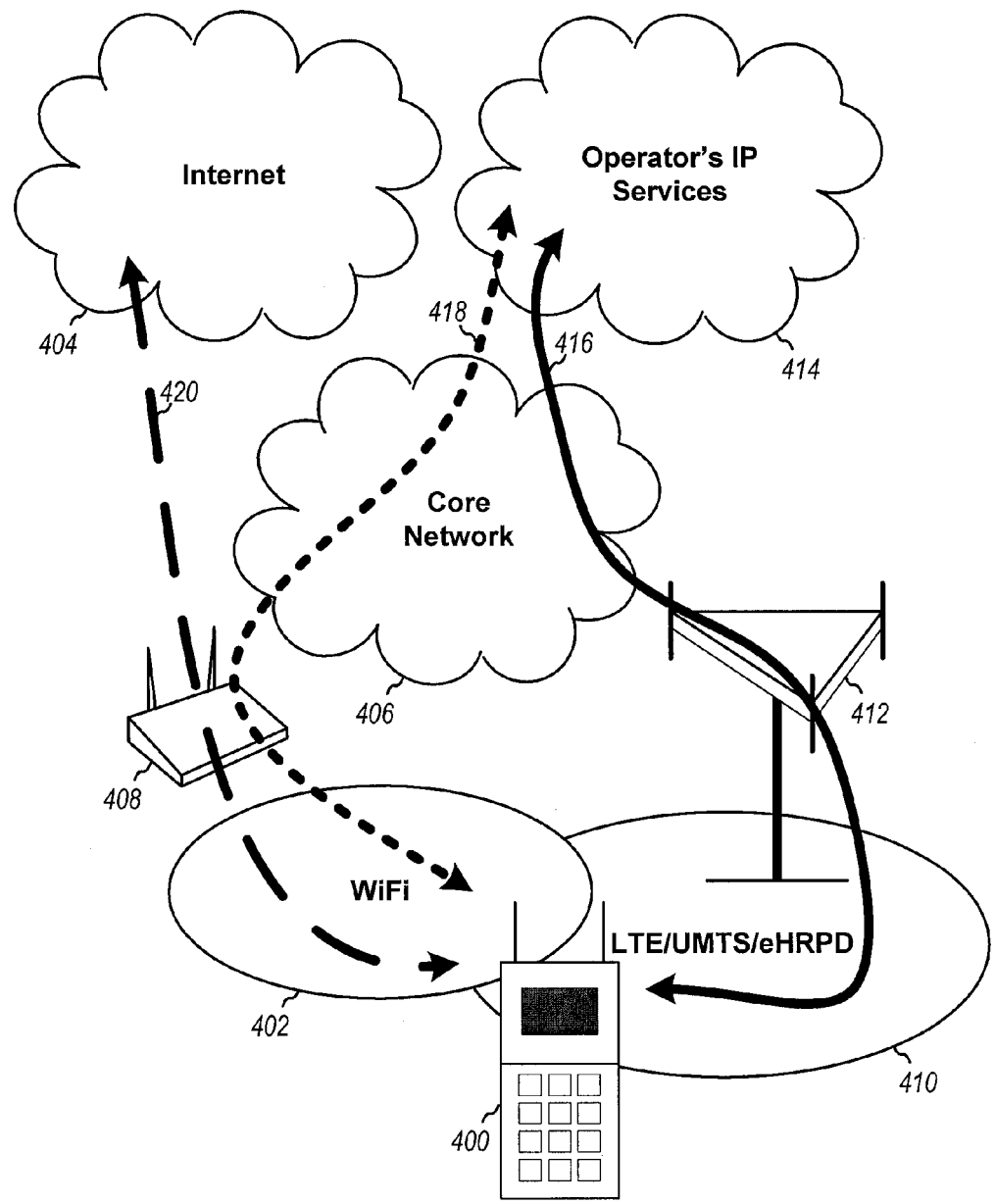
FIG. 4 is a block diagram illustrating simultaneous network connections to multiple radio access technologies according to one aspect of the present disclosure.

In accordance with the present disclosure, techniques are provided for supporting WLAN-WWAN mobility in devices, such as UEs. Referring to FIG. 4, a device 400, such as a UE, that is configured according to the concepts herein is capable of handing off data streams to WWAN and/or WLAN while maintaining IP mobility, and may also provide simultaneous network connections to multiple radio access technologies. It should be understood that all PDN connections to a given APN (e.g., IP address, port number, and/or next-protocol field) may be through a single access network (i.e., either WLAN or WWAN). It should also be understood that the device 400 may have two or more modems. For example, a WLAN modem of device 400 may provide connection via WiFi 402 to the Internet 404, and also provide connection to a core network 406 via a WiFi router 408. Additionally, a WWAN modem of device 400 may provide connection via LTE/UMTS/eHRPD 410 to the core network 406 via a cellular base station 412. The device 400 is therefore able to obtain access to the operator's IP services 414 through the core network 406 by either WLAN or WWAN, and may do so simultaneously in some aspects.

As will be described in detail, the device 400 may be equipped with mobile processor chipsets that include a Modem Processor (MP) and an Applications Processor (AP) that are adapted according to the concepts herein to cooperate in a hand off procedure in accordance with an IP mobility protocol, such as GPT. Alternatively or additionally, the applications processor may perform routing in accordance with an ISRP, such as an IP-Flow-MAPCON ISRP. Accordingly, the device 400 may have multiple data streams, including a first data stream 416 having a first APN and that accesses the operator's IP services 414 over WWAN, and a second data stream 418 having a second APN and that accesses the operator's IP services 414 over WLAN. Additionally, the device 400 may have a third data stream 420 that accesses the interne 404 by non-seamless WLAN offload. It should be understood that all three data streams 416, 418, and 420 may be maintained simultaneously, and that either of the first data stream 416 and the second data stream 418 may be rerouted through WWAN or WLAN while utilizing the same APN. Thus, a data stream may be handed off from WWAN to WLAN, or vice versa, while maintaining IP mobility.

In order to support WLAN-WWAN mobility in devices, aspects of the present disclosure may implement preferable access network selection based on policies and/or conditions. For example, static configurable policies may be used. Alternatively or additionally, dynamic policies may be regularly updated and/or configured over the WWAN and/or WLAN. Conditions observed may be based on, among other things, optimal WLAN scanning.

In further aspects, support of WLAN-WWAN mobility in devices may be accomplished by WLAN offload, packet routing between modems, and IP mobility. For example, WLAN offload may be WLAN local breakout or Intelligent WLAN (IWLAN) with the operator's core network 406, which is also termed the Evolved Packet Core (EPC). For the WLAN offload, authentication and IPsec setup may be provided for WLAN access, if needed, and PDN connectivity may be established via WLAN access. Additionally, packet routing between modems may provide for routing between the MP, AP, and WLAN modem. Also, IP mobility may include ensuring that the same APN is acquired for a data stream in both WWAN and WLAN.

The techniques of the present disclosure may be implemented as functional blocks in a manner that provides several advantages. For example, new functional blocks may be implemented that are common to all High Level Operating Systems (HLOS), thus minimizing the work required on each HLOS and eliminating dependency on HLOS vendors. Additionally, these new functional blocks may be operable with all standard techniques for WLAN-WWAN mobility/offload (e.g., evolved Packet Data Gateway (ePDG), S2a Mobility based on General Packet Radio Service Tunneling Protocol (SAMOG), etc.), although specifics of protocols to be used may vary. Also, these new functional blocks may operate with today's chipset models in which the WLAN modem is attached to the AP. Further, an architecture provided by these functional blocks may be power efficient by avoiding use of the MP for data transfer whenever possible in today's chipsets. Yet further, these new functional blocks may be applied to future chipset models with tight integration of or direct connectivity between the WLAN modem and the MP.

Figure 5:
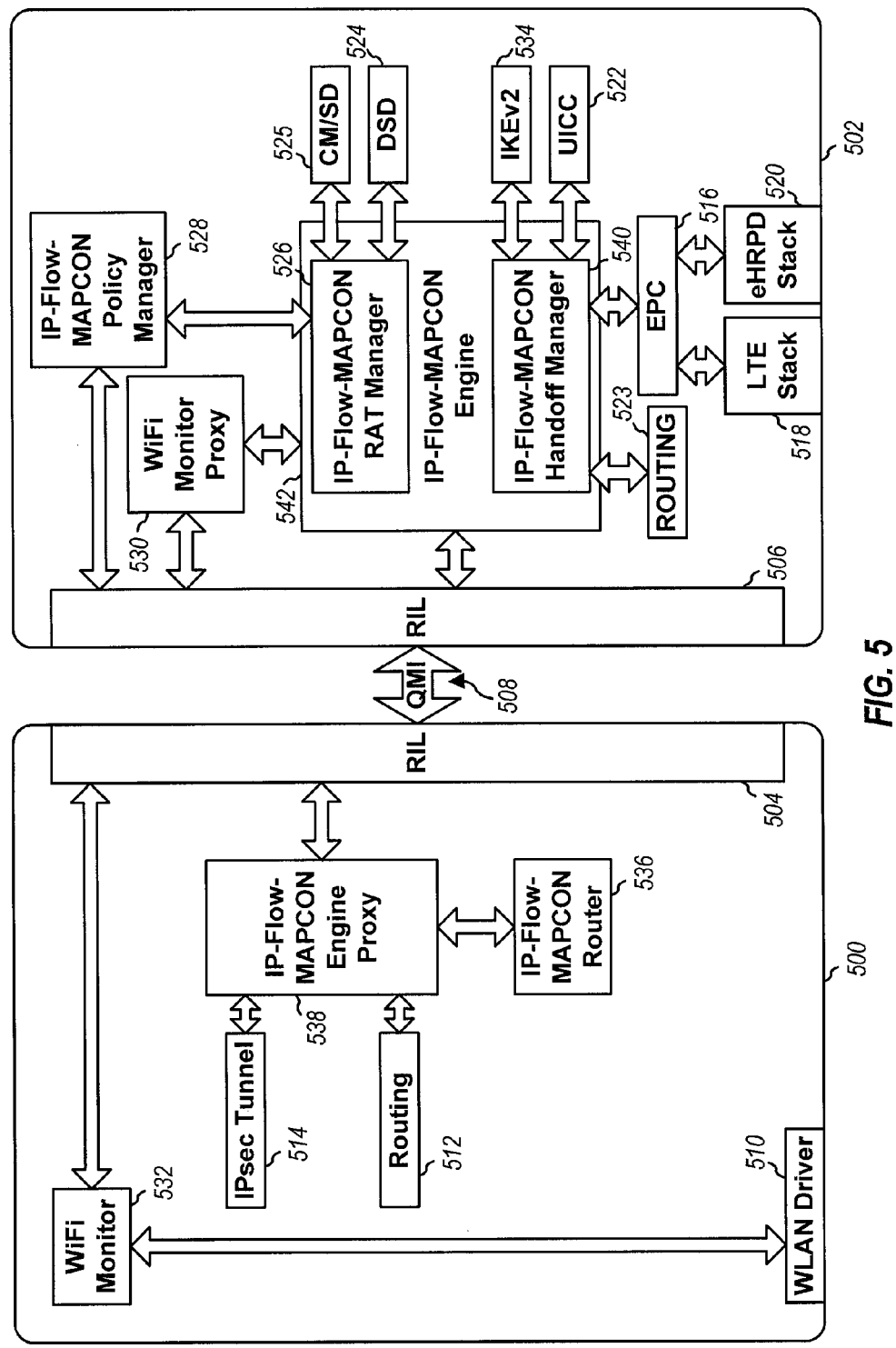
FIG. 5 is a block diagram conceptually illustrating a device implementing techniques for supporting WLAN-WWAN mobility in accordance with one aspect of the present disclosure.

FIG. 5 shows a device implementing techniques for supporting WLAN-WWAN mobility. In the illustrated example, a device comprises an AP 500 interfaced with an MP 502. The device configuration illustrated in FIG. 5 produces a modem-centric architecture implementing the concepts herein.

In some aspects, the AP 500 may have a plurality of HLOS modules, such as WLAN driver 510, routing module 512, and IPsec Tunnel module 514. In additional aspects, the MP 502 may have several standard modules, such as EPC module 516, LTE Stack 518, evolved High Rate Packet Data (eHRPD) stack 520, Universal Integrated Circuit Card (UICC) 522, Routing Process 523, Data System Determination (DSD) 524, and Call Manager/System Determination (CM/SD) module 525. These components will be readily understood by those skilled in the art.

According to the modem-centric architecture for supporting WLAN-WWAN mobility in the device, the AP 500 and MP 502 may be interfaced via radio interface layers 504 and 506 communicating via any suitable protocol 508, such as QUALCOMM™ Mobile Station Modem Interface (QMI). In this modem-centric architecture, a primary control entity for IWLAN data control, including WLAN access selection, Internet Key Exchange (IKEv2) authentication and tunnel setup, and IP mobility, is located on MP 502. This IWLAN control entity is denoted IP-Flow-MAPCON Engine 526. The IP-Flow-MAPCON engine 526 performs the major control functions for IWLAN data control, including WLAN access selection, IKEv2 authentication and tunnel setup, and IP mobility between WWAN and WLAN. Additionally, an IP-Flow-MAPCON Policy Manager 528 is also located on the MP 502, and it determines the access network among WWAN and WLAN. Also, a WiFi Proxy Monitor 530 is located on the MP 502, and this functional block interacts with a WiFi Monitor 532 located AP 500 through the protocol 508. The WiFi Proxy Monitor 532 receives WiFi related parameters, such as signal quality.

On the AP 500, an IP-Flow-MAPCON Router 536 is responsible for routing packets to the correct protocol stack or interface. Additionally, an IP-Flow-MAPCON Engine Proxy 538 responsively interacts with the IP-Flow-MAPCON Engine 526 on the MP 502 to perform part of a data stream hand off initiated by an IP-Flow-MAPCON Handoff Manager 540 of the IP-Flow-MAPCON Engine 526. Based on the signal received from the IP-Flow-MAPCON Engine 526, which directs the IKEv2 protocol 534 located on the MP 502 to perform IKEv2 authentication, the IP-Flow-MAPCON Engine Proxy 538 sets up a tunnel, such as an IPsec tunnel. It also interacts with Routing module 512 and the IP-Flow-MAPCON Routing module 536 to route packets appropriately. The WiFi Monitor 532 is responsible for WIFI scanning and signal measurement. It provides information for an IP-Flow-MAPCON Radio Access Technology (RAT) manager 542 of the IP-Flow-MAPCON Engine 526 to determine and select the access network according to input from the WiFi Monitor Proxy 530 and the IP-Flow-MAPCON Policy Manager 528.

Figure 6:
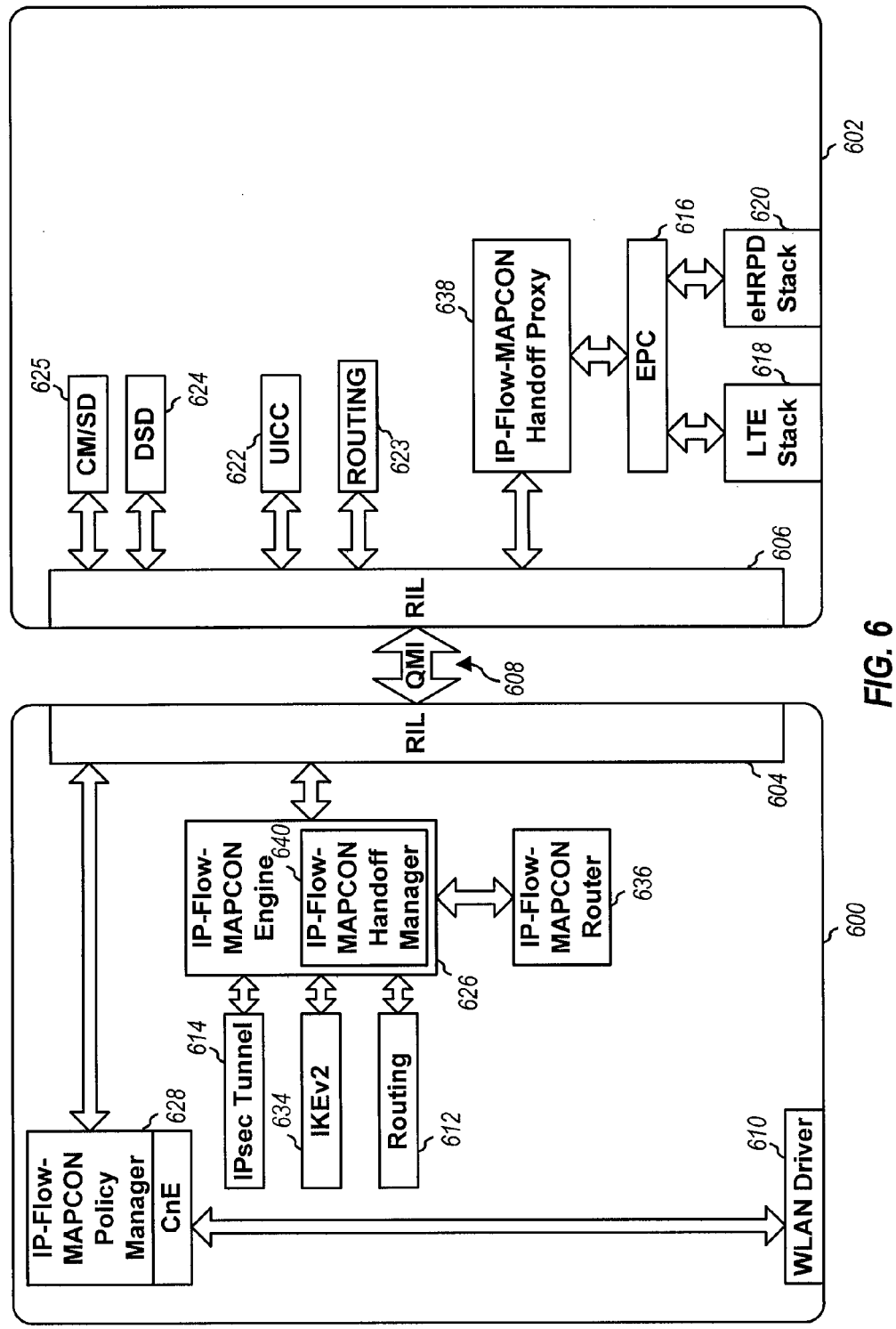
FIG. 6 is a block diagram conceptually illustrating a device implementing techniques for supporting WLAN-WWAN mobility in accordance with one aspect of the present disclosure.

FIG. 6 shows another device implementing techniques for supporting WLAN-WWAN mobility according to concepts herein. In the illustrated example, the device has an AP 600 interfaced with an MP 602. The configuration illustrated in FIG. 6 provides an AP-centric architecture implementing the concepts herein.

In some aspects, the AP 600 may have a plurality of HLOS modules, such as WLAN driver 610, routing module 612, and IPsec Tunnel module 614. In additional aspects, the MP 602 may have several standard modules, such as EPC module 616, LTE Stack 618, eHRPD stack 620, UICC 622, Routing Process 623, DSD 624, and CM/SD module 625. These components will be readily understood by those skilled in the art.

According to an AP-centric architecture for supporting WLAN-WWAN mobility in the device, the AP 600 and MP 602 may be interfaced via radio interface layer (RIL) 604 and RIL 606 communicating via any suitable protocol 608, such as QMI. In this AP-centric architecture, a primary control entity for IWLAN data control, including WLAN access selection, IKEv2 authentication and tunnel setup, and IP mobility, is located on AP 602. This IWLAN control entity is denoted IP-Flow-MAPCON Engine 626. The IP-Flow-MAPCON engine 626 performs the major control functions for IWLAN data control, including WLAN access selection, IKEv2 authentication and tunnel setup, and IP mobility between WWAN and WLAN. It incorporates information that it receives from other entities, which may be located on the MP 602, and makes decisions. Additionally, an IP-Flow-MAPCON Policy Manager 628 is also located on the AP 600, and it determines the access network among WWAN and WLAN.

On the AP 600, an IP-Flow-MAPCON Router 636 is responsible for routing packets to the correct protocol stack or interface. A IP-Flow-MAPCON Handoff Proxy 638 on the MP 602 responsively interacts with the IP-Flow-MAPCON Engine 626 on the AP 602 to perform part of a data stream hand off initiated by an IP-Flow-MAPCON Handoff Manager 640 of the IP-Flow-MAPCON Engine 626. Based on the signal received from the IP-Flow-MAPCON Engine 626, the IP-Flow-MAPCON Handoff Proxy 638 interacts with IKEv2 protocol 634 located on the AP 600 to perform IKEv2 authentication and tunnel setup. It also interacts with Routing module 612 and the IP-Flow-MAPCON Routing module 636 to route packets appropriately.

Figure 7:
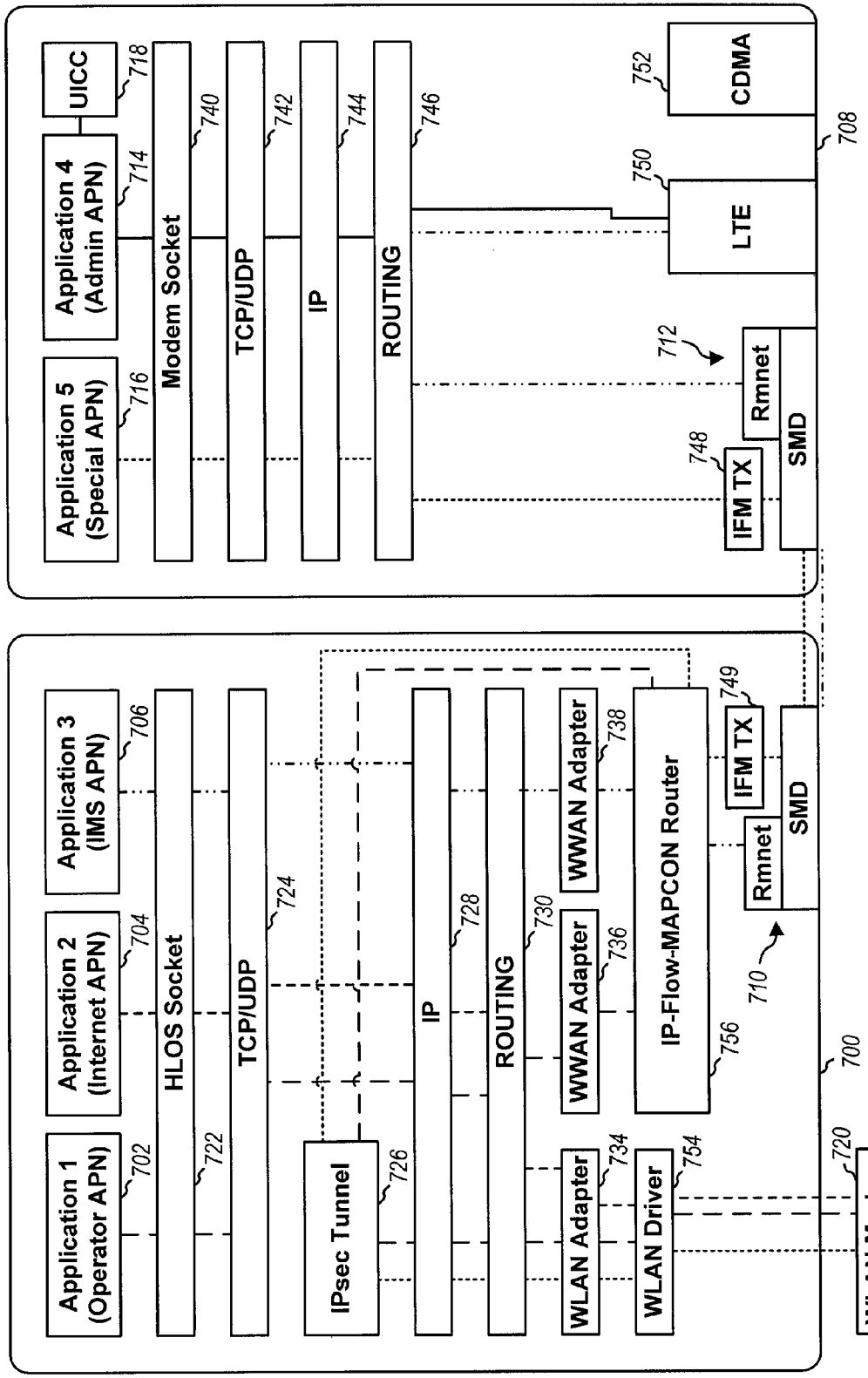
FIG. 7 is a data flow diagram conceptually illustrating implementation of techniques for supporting WLAN-WWAN mobility in accordance with one aspect of the present disclosure.

FIG. 7 illustrates an example of data flow according to techniques for supporting WLAN-WWAN mobility in devices. In this example, an AP 700 has three applications, including a first application 702, a second application 704, and a third application 706. Also, an MP 708 interfaces with the AP 700 via radio interface layers 710 and 712. Additionally, the MP 708 has two applications, including a fourth application 714 and a fifth application 716. According to this data flow example, the MP 708 has a UICC 718, and the AP 700 connects directly to a WLAN modem 720 as previously described. Additionally, the AP 700 has several HLOS processes, including an HLOS socket 722, a Transmission Control Protocol/User Datagram Protocol (TCP/UDP) process 724, an IPsec tunnel process 726, an IP stack 728, a routing process 730, a WLAN adapter 734, and WWAN adapters 736 and 738. One skilled in the art will readily understand these HLOS processes. Additionally, one skilled in the art will also apprehend that the HLOS routing process 730 could be implemented to support WLAN-WWAN mobility in devices, but that the present disclosure advantageously avoids dependence on HLOS vendors for this support.

According to this data flow example, the five applications have PDN connections to different APNs. For example, the first application 702 running on the AP 700 connects to the operator's application APN over IWLAN. Additionally, the second application 704 running on the AP 700 connects to the Internet APN over WLAN local breakout. Also, the third application 706 running on AP 700 connects to the IP Multimedia Subsystem (IMS) APN over WWAN. Further, the fourth application 714 running on the MP 708 connects to the Admin APN over WWAN. Yet further, the fifth application 716 running on the MP 708 connects to the Special APN over IWLAN.

The AP 700 and MP 708 have several processes for data flow according to aspects of the present disclosure. For example, MP 708 has a modem socket 740, a TCP/UDP process 742, and an IP stack 744. These processes supply data flows from the fourth application 714 and fifth application 716 to routing process 746, which routes the data flows to an IP-Flow-MAPCON transporter 748, and/or to appropriate protocol stacks, such as LTE stack 750 or CDMA stack 752. Also, AP 700 has WLAN driver 754, IP-Flow-MAPCON router 756, and IP-Flow-MAPCON transporter 749. The IP-Flow Mapcon transporters 748 and 749 on the MP 708 and AP 700 are used for sending and receiving data to and from the IP-Flow-MAPCON router 756 for data destined to, or originating from, applications running on the MP 708 that require WLAN access. However, it is envisioned that most applications will run on the AP 700.

In operation, the HLOS routing process 730 routes data flows of the first application 702, second application 704, and third application 706 to the WLAN adapter 734 and the WWAN adapters 736 and 738. In this example, the HLOS routing process 730 observes the Internet APN of the data flow of the second application 704, and routes it to the WLAN adapter 734 for delivery to WLAN driver 754 and WLAN modem 720. Similarly, the HLOS routing process 730 observes the Operator APN of the data flow of the first application and the IMS APN of the data flow of the third application 706, and routes these data flows to the WWAN adapters 736 and 738, respectively.

As mentioned above, data flows may be rerouted in accordance with policies that may be static, dynamic, and/or user configurable. One such policy may be routing of data streams of applications on the MP 708 to WLAN via the AP 700 whenever possible, such as whenever the WiFi signal quality exceeds a threshold. Additionally, policies may be defined to reroute data streams of applications on the AP 700 to WWAN via the MP 708 only when absolutely necessary, such as only when the WiFi signal quality falls below a threshold. A user setting on the device may additionally prevent such rerouting in order to conserve battery life by preventing rerouting of data streams from the AP 700 to the MP 708, and/or requiring rerouting of data stream from the MP 708 to the AP 700. Additional or alternative policies will also be readily apparent to one skilled in the art.

The data flows from the WWAN adapters 736 and 738 are intercepted by the IP-Flow-MAPCON router 756. In this example, the IP-Flow-MAPCON router 756 reroutes the data flow of the first application 702 to the IPsec tunnel process 726 for delivery through IP stack 728 to HLOS routing process 730. The HLOS routing process 730 then routes this data flow to the WLAN adapter 734 for delivery to WLAN driver 754 and WLAN modem 720. Also according to this example, the IP-Flow-MAPCON router 756 routes the data flow from the third application 706 to RIL interface layer 710 for delivery to MP 708. The RIL interface layer 712 of MP 708 receives the data flow of the third application 706, and delivers it to routing process 746. Routing process 746 then directs this data flow to LTE stack 750.

On the MP 708, the data flow of the fourth application 714 has a straightforward path through modem socket 740, TCP/UPD process 742, IP stack 744, and routing process 746 to LTE stack 750. However, the data flow of the fifth application 716 is routed by routing process 746 to IP-Flow-MAPCON transporter 748 for delivery through the RIL interfaces 712 and 710 to IP-Flow-MAPCON transporter 749. IP-Flow-MAPCON transporter 749 delivers the data flow of the fifth application to the IP-Flow-MAPCON router 756 on the AP 700. IP-Flow-MAPCON router 756 routes this data flow to the IPsec tunnel process 726 for delivery through IP stack 728 to HLOS routing process 730. The HLOS routing process 730 then routes this data flow to the WLAN adapter 734 for delivery to WLAN driver 754 and WLAN modem 720. Accordingly, it should be readily understood that these processes accomplish simultaneous data flows in accordance with the mobile IP protocol and the IP-Flow-MAPCON inter-system routing policy, and that they do so independently of HLOS processes.

Figure 8:
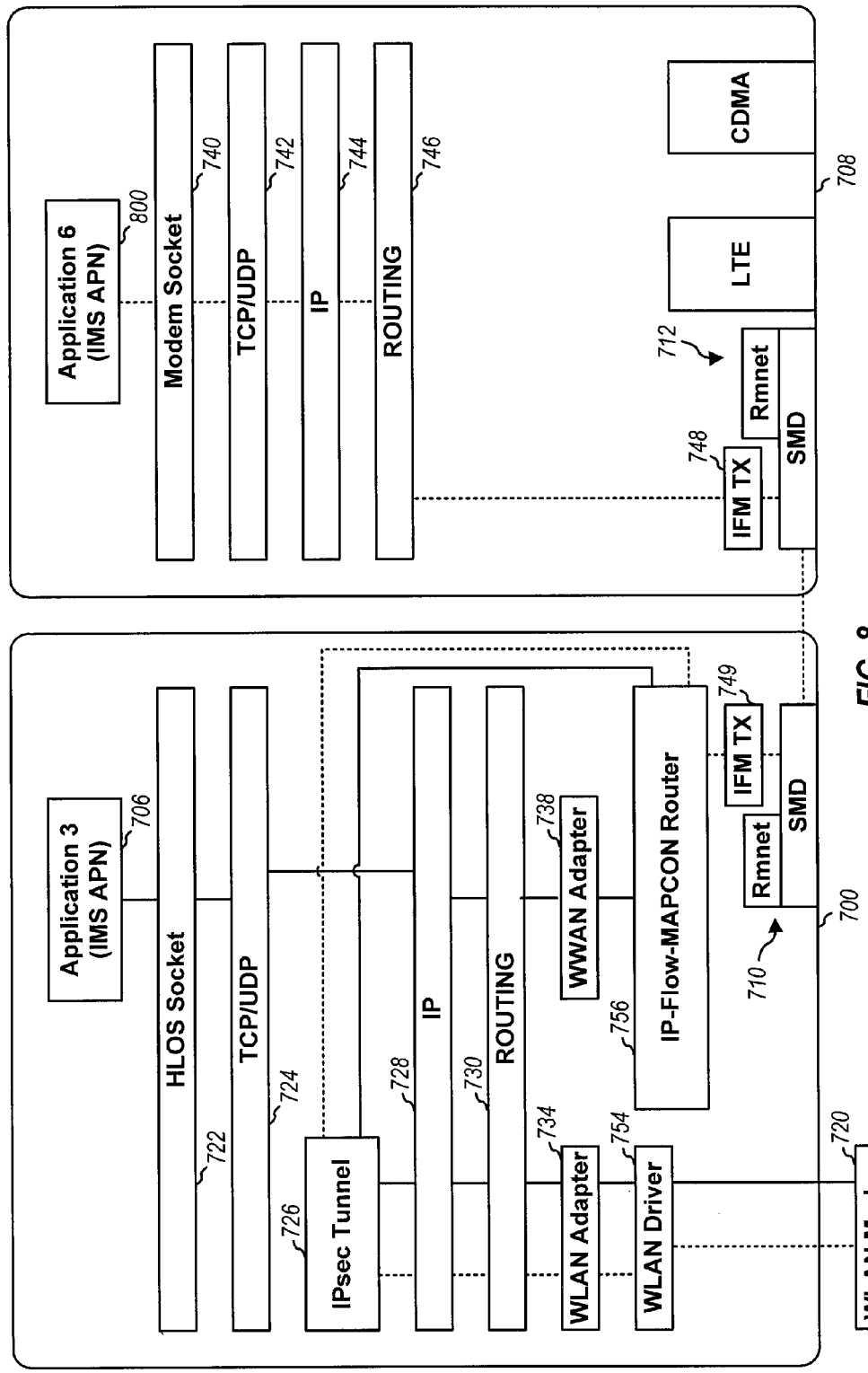
FIG. 8 is a data flow diagram conceptually illustrating implementation of techniques for supporting WLAN-WWAN mobility in accordance with one aspect of the present disclosure.

FIG. 8 illustrates another example of data according to techniques for supporting WLAN-WWAN mobility. In this example, simultaneous access to the same APN is accomplished from multiple applications on different processors. Here, the third application 706 running on AP 700 again connects to the IMS APN over WWAN. Additionally, a sixth application 800 running on MP 708 also connects to the IMS APN over WWAN. Again, HLOS socket 722, TCP/UDP process 724, and IP stack 726 supply the data flow of the third application 706 to HLOS routing process 730, which routes the data flow to WWAN adapter 738 for interception by IP-Flow-MAPCON router 756. The data flow of the sixth application 800 is processed by modem socket 740, TCP/UPD process 742, and IP stack 744, and delivered to routing process 746. In this example, routing process 746 routes the data flow to IP-flow-MAPCON transporter 748 for delivery through RIL interface layers 712 and 710, and via IP-flow-MAPCON transporter 749, to the IP-Flow-MAPCON router 756 on the AP 700. IP-Flow-MAPCON router 756 routes both of these data flows to the IP sec tunneling process 726 for delivery through IP stack 728 to HLOS routing process 730. The HLOS routing process 730 then routes both data flows to the WLAN adapter 734 for delivery to WLAN driver 754 and WLAN modem 720. Accordingly, it should be readily appreciated that aspects of the present disclosure are able to accomplish simultaneous access to the same APN from multiple applications on different processors.

In operation, the IP-Flow-MAPCON router 756 observes an IP header (e.g., IP address, port number, and/or proto field), and determines whether the uplink packets coming from the WWAN adapters, generated on the AP 700, should be routed to a WWAN stack on the MP 708 or to IWLAN via the IPsec tunneling process 726. The IP-Flow-MAPCON router 756 also determines whether the uplink packets coming from the RIL interface 712 generated on the MP 708 should be routed to IWLAN via the IPsec tunneling process 726, or to the WLAN adaptor 734 for WLAN local breakout. The IP-Flow-MAPCON router 756 further determines whether the downlink packets decapsulated by the IPsec tunneling process 726 should be routed to the WWAN adapter 738 towards an application on the AP 700, or to the RIL interface 710 on the AP 700 towards an application on the MP 708. Meanwhile, the routing process 746 on the MP 708 routes uplink packets generated on MP 708 to WLAN via the IP-flow-MAPCON transporter 748. On the downlink, the routing process 746 on the MP 708 routes packets from IP-flow-MAPCON transporter 748 to the IP stack 744 on the MP 708.

Figure 9:
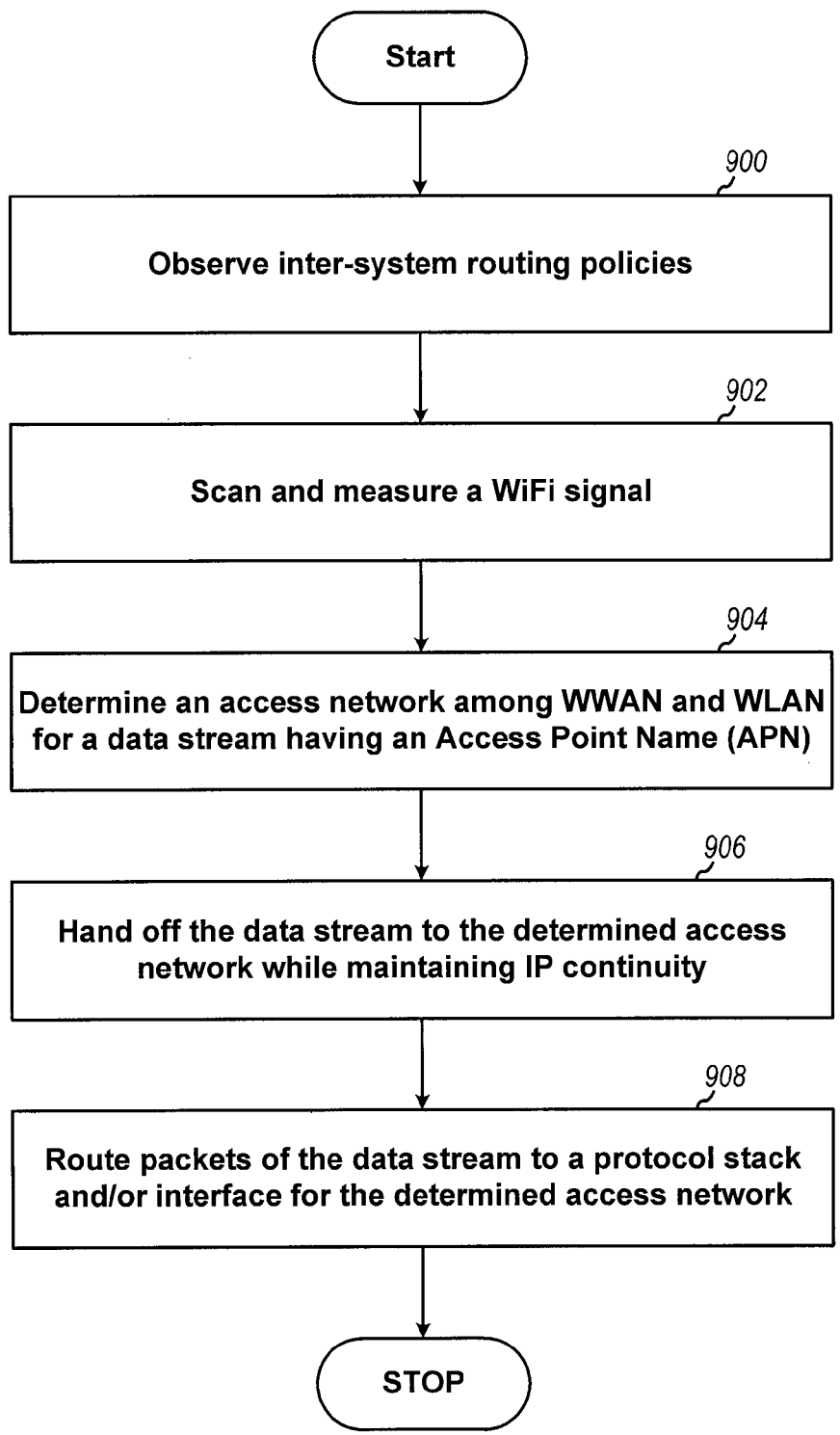
FIG. 9 is a functional block diagram conceptually illustrating example blocks executed by a device according to one aspect of the present disclosure.

FIG. 9 illustrates example blocks executed by a device, such as a UE, according to techniques for supporting WLAN-WWAN mobility. In some aspects, one or more processors of the device may observe policies at block 900, such as static configurable policies (i.e., predetermined policies), dynamic policies updated over a WWAN and/or WLAN, or a user selection asserted by a user of the device. These policies may be IP-Flow-MAPCON policies. For example, in some aspects, a modem processor of the device may have a policy manager to observe the policies as discussed above. In other aspects, an applications processor of the device may have the policy manager. At block 902, the one or more processors of the device may scan and measure a WiFi signal. In some aspects, an applications processor of the device may perform the scanning and measuring, and a modem processor of the device may receive results of the scanning and measuring.

At block 904, the one or more processors of the device may determine an access network among WWAN and WLAN for a data stream having an APN. In some aspects, this determining may be based at least in part on the results of the scanning and measuring performed at block 902, and the policies observed at block 900. For example, the results may indicate conditions, such as signal quality, with respect to which the observed policies are defined to trigger initiation of a hand off procedure in accordance with an IP mobility protocol, such as GPT, at block 906. Thus, at block 906, the one or more processors of the device may hand off the data stream according to the determined access network by performing authentication and tunnel setup, and obtaining the APN for the data stream in the determined access network in accordance with the IP mobility protocol. In some aspects, the modem processor of the device may perform the determining at block 904, and initiate the handing off at block 906. For example, the applications processor may interact with the modem processor to perform at least part of the handing off as discussed in detail above with reference to FIG. 5. In other aspects, the applications processor may perform the determining at block 904, and initiate the handing off at block 906. For example, the modem processor may interact with the applications processor to perform at least part of the handing off as discussed in detail above with respect to FIG. 6.

At block 908, the one or more processors of the device may route packets of the data stream to a protocol stack and/or interface for the determined access network in accordance with an inter-system routing policy, such as an IP-Flow-MAPCON ISRP. For example, the applications processor may perform the routing, based on an Internet Protocol (IP) header, by determining whether uplink packets received from one or more WWAN adapters on the applications processor should be routed to a WWAN stack on the modem processor or WLAN via IPsec tunneling. Alternatively or additionally, the applications processor may perform the routing, based on an Internet Protocol (IP) header, by determining whether uplink packets received from the modem processor should be routed to WLAN via IPsec tunneling, or to a WLAN adapter for local breakout. In additional or alternative aspects, the applications processor may further perform the routing, based on the IP header, by determining whether downlink packets decapsulated by IPsec tunneling should be routed to the one or more WWAN adapters towards an application on the applications processor, or routed to the modem processor towards another application on the modem processor. Further, in other aspects, the routing can be performed based on which WWAN adapter is the source of the traffic, without requiring use of the IP header information.

Although IP-Flow-MAPCON and GPT were referred to in the examples described above with respect to FIG. 4-9, it should be understood that alternative or additional IP mobility and ISRP standards may be employed. For example, employing ePDG based solutions, SAMOG, and/or DSMIP, as mentioned above, are intended to be within the scope of the present disclosure. Also, it is envisioned that future protocols and standards for WWLAN-WWAN mobility and simultaneous connectivity may be supported in accordance with the concepts disclosed herein. Additionally, while IPsec tunneling is described, it should be understood that any suitable tunneling process may be used, such as Generic Routing Encapsulation (GRE), IP in IP, or other suitable tunneling process.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
    identifying, by a user equipment (UE), a data stream on a first access network, wherein the data stream is associated with an access point name (APN), and the first access network comprises one of: a wireless wide area network (WWAN) or a wireless local area network (WLAN);
    determining, by the UE, a second access network different from the first access network for offloading the data stream, wherein the second access network comprises one of: the WWAN or the WLAN;
    handing off the data stream, by the UE, from the first access network to the determined second access network, while maintaining Internet Protocol (IP) continuity by utilizing the APN associated with the data stream; and
    routing packets of the data stream, by the UE, to the determined second access network in accordance with one or more of an operator policy or a user setting,
    wherein the UE has an applications processor and a modem processor, said modem processor having an IP flow Multi Access Packet Data Network Connectivity (MAPCON) engine that performs control functions for intelligent WLAN control, a WiFi monitor proxy that interacts with a WiFi monitor of the applications processor to receive WiFi related parameters that at least include WiFi signal quality, and an IP flow MAPCON policy manager that determines an access network among WWAN and WLAN,
    wherein an IP flow MAPCON radio access technology (RAT) manager of the IP flow MAPCON engine determines and selects an access network according to input from the WiFi monitor proxy and the IP flow MAPCON policy manager, and
    wherein the applications processor has an IP flow MAPCON engine proxy that interacts with the IP flow MAPCON engine to perform part of the handing off the data stream initiated by an IP flow MAPCON handoff manager of the IP flow MAPCON engine, and an IP flow MAPCON router that routes packets to the determined second access network.

2. The method of claim 1, further including:
    scanning and measuring, by the WiFi monitor of the applications processor, a WiFi signal; and
    receiving, by the WiFi monitor proxy of the modem processor, results of the scanning and measuring, wherein the determining is performed, by the IP flow MAPCON RAT manager, based on the WiFi signal strength and a threshold specified by a policy managed by the IP flow MAPCON policy manager.

3. The method of claim 1, further including configuring, via the IP flow MAPCON policy manager of the modem processor, a set of policies on at least one of a per APN basis or a per IP-flow basis,
wherein the set of policies are at least one of statically configured or dynamically downloaded from the first access network,
wherein the set of policies define when and where the data stream associated with the APN should be routed over the second access network,
wherein the determining the second access network is based at least in part on the set of policies, and
wherein the set of policies includes a policy of rerouting data streams of applications on the modem processor to WLAN via the applications processor whenever the WiFi signal quality exceeds a threshold, a policy of rerouting data streams of applications on the applications processor to WWAN via the modem processor only when the WiFi signal quality falls below another threshold, a policy of preventing rerouting of data streams from the applications processor to the modem processor in response to the user setting, and a policy of requiring rerouting of data streams from the modem processor to the applications processor in response to another user setting.

4. The method of claim 1, wherein the routing is performed by at least one of the applications processor or the modem processor by:
determining whether uplink packets received from one or more WWAN adapters on the applications processor should be routed to at least one of a WWAN stack on the modem processor or WLAN via tunneling; and
determining whether uplink packets received from the modem processor should be routed to at least one of WLAN via tunneling, or to a WLAN adapter for local breakout.

5. The method of claim 4, wherein the routing is further performed by the at least one of the applications processor or the modem processor by:
determining whether downlink packets decapsulated by tunneling should be routed to at least one of the one or more WWAN adapters towards an application on the applications processor, or routed to the modem processor towards another application on the modem processor.

6. The method of claim 1, further including determining the second access network responsive to at least one of predetermined policies, dynamic policies received over the first access network, or a user selection asserted by a user of the UE.

7. The method of claim 1, wherein the handing off the data stream includes performing authentication and tunnel setup, and utilizing the APN associated with the data stream in the determined second access network in accordance with a General Packet Radio Service (GPRS) Protocol Tunnel (GPT).

8. An apparatus for wireless communication, said apparatus comprising:
means for identifying, by a user equipment (UE), a data stream on a first access network, wherein the data stream is associated with an access point name (APN), and the first access network comprises one of: a wireless wide area network (WWAN) or a wireless local area network (WLAN);
means for determining, by the UE, a second access network different from the first access network for offloading the data stream, wherein the second access network comprises one of: the WWAN or the WLAN;
means for handing off the data stream, by the UE, from the first access network to the determined second access network while maintaining Internet Protocol (IP) continuity by utilizing the APN associated with the data stream; and
means for routing packets of the data stream, by the UE, to the determined second access network in accordance one or more of an operator policy or a user setting,
wherein the UE has an applications processor and a modem processor, said modem processor having an IP flow Multi Access Packet Data Network Connectivity (MAPCON) engine that performs control functions for intelligent WLAN control, a WiFi monitor proxy that interacts with a WiFi monitor of the applications processor to receive WiFi related parameters that at least include WiFi signal quality, and an IP flow MAPCON policy manager that determines an access network among WWAN and WLAN,
wherein an IP flow MAPCON radio access technology (RAT) manager of the IP flow MAPCON engine determines and selects an access network according to input from the WiFi monitor proxy and the IP flow MAPCON policy manager, and
wherein the applications processor has an IP flow MAPCON engine proxy that interacts with the IP flow MAPCON engine to perform part of the handing off the data stream initiated by an IP flow MAPCON handoff manager of the IP flow MAPCON engine, and an IP flow MAPCON router that routes packets to the at least one of the determined second access network.

9. The apparatus of claim 8, further including:
means for scanning and measuring, by the WiFi monitor of the applications processor, a WiFi signal; and
means for receiving, by the WiFi monitor proxy of the modem processor, results of the scanning and measuring, wherein the determining performed, by the IP flow MAPCON RAT manager, based on the WiFi signal strength and a threshold specified by a policy managed by the IP flow MAPCON policy manager.

10. The apparatus of claim 8, further including means for configuring, via the IP flow MAPCON policy manager of the modem processor, a set of policies on at least one of a per APN basis or a per IP-flow basis,
wherein the set of policies are at least one of statically configured or dynamically downloaded from the first access network,
wherein the set of policies define when and where the data stream associated with the APN should be routed over the second access network,
wherein the means for the determining performs the determining based at least in part on the set of policies, and
wherein the set of policies includes a policy of rerouting data streams of applications on the modem processor to WLAN via the applications processor whenever the WiFi signal quality exceeds a threshold, a policy of rerouting data streams of applications on the applications processor to WWAN via the modem processor only when the WiFi signal quality falls below another threshold, a policy of preventing rerouting of data streams from the applications processor to the modem processor in response to the user setting, and a policy of requiring rerouting of data streams from the modem processor to the applications processor in response to another user setting.

11. The apparatus of claim 8, wherein the means for the routing includes:
means for determining whether uplink packets received from one or more WWAN adapters on the applications processor should be routed to at least one of a WWAN stack on the modem processor or WLAN via tunneling; and
means for determining whether uplink packets received from the modem processor should be routed to at least one of WLAN via tunneling, or to a WLAN adapter for local breakout.

12. The apparatus of claim 11, wherein the means for the routing includes:
means for determining whether downlink packets decapsulated by tunneling should be routed to at least one of the one or more WWAN adapters towards an application on the applications processor, or routed to the modem processor towards another application on the modem processor.

13. The apparatus of claim 8, wherein the means for determining the second access network includes:
means for observing and being responsive to at least one of predetermined IP-Flow-MAPCON policies, dynamic IP-Flow-MAPCON policies received over the first access network, or a user selection asserted by a user of the UE.

14. The apparatus of claim 8, wherein the means for the handing off the data stream includes means for performing authentication and tunnel setup, and means for utilizing the APN associated with the data stream in the determined second access network in accordance with a General Packet Radio Service (GPRS) Protocol Tunnel (GPT).

15. A computer program product for wireless communication, the computer program product comprising:
a non-transitory computer-readable medium including:
code for identifying, by a user equipment (UE), a data stream on a first access network, wherein the data stream is associated with an access point name (APN), and the first access network comprises one of: a wireless wide area network (WWAN) or a wireless local area network (WLAN);
code for determining, by the UE, a second access network different from the first access network for offloading the data stream, wherein the second access network comprises one of: the WWAN or the WLAN;
code for handing off the data stream, by the UE, from the first access network to the determined second access network, while maintaining Internet Protocol (IP) continuity by utilizing the APN associated with the data stream; and
code for routing packets of the data stream, by the UE, to the determined second access network in accordance with one or more of an operator policy or a user setting,
wherein the UE has an applications processor and a modem processor, said modem processor having an IP flow Multi Access Packet Data Network Connectivity (MAPCON) engine that performs control functions for intelligent WLAN control, a WiFi monitor proxy that interacts with a WiFi monitor of the applications processor to receive WiFi related parameters that at least include WiFi signal quality, and an IP flow MAPCON policy manager that determines an access network among WWAN and WLAN,
wherein an IP flow MAPCON radio access technology (RAT) manager of the IP flow MAPCON engine determines and selects an access network according to input from the WiFi monitor proxy and the IP flow MAPCON policy manager, and
wherein the applications processor has an IP flow MAPCON engine proxy that interacts with the IP flow MAPCON engine to perform part of the handing off the data stream initiated by an IP flow MAPCON handoff manager of the IP flow MAPCON engine, and an IP flow MAPCON router that routes packets to the at least one of the determined second access network.

16. The computer program product of claim 15, further including:
code for scanning and measuring, by the WiFi monitor of the applications processor, a WiFi signal; and
code for receiving, by the WiFi monitor proxy of the modem processor, results of the scanning and measuring, wherein the determining is performed, by the IP flow MAPCON RAT manager, based on the WiFi signal strength and a threshold specified by a policy managed by the IP flow MAPCON policy manager.

17. The computer program product of claim 15, further including code for configuring, via the IP flow MAPCON policy manager of the modem processor, a set of policies on at least one of a per APN basis or a per IP-flow basis,
wherein the set of policies are at least one of statically configured or dynamically downloaded from the first access network,
wherein the set of policies define when and where the data stream associated with the APN should be routed over the second access network,
wherein the code for the determining performs the determining based at least in part on the policies, and
wherein the set of policies includes a policy of rerouting data streams of applications on the modem processor to WLAN via the applications processor whenever the WiFi signal quality exceeds a threshold, a policy of rerouting data streams of applications on the applications processor to WWAN via the modem processor only when the WiFi signal quality falls below another threshold, a policy of preventing rerouting of data streams from the applications processor to the modem processor in response to the user setting, and a policy of requiring rerouting of data streams from the modem processor to the applications processor in response to another user setting.

18. The computer program product of claim 15, wherein the code for the routing includes:
code for determining whether uplink packets received from one or more WWAN adapters on the applications processor should be routed to at least one of a WWAN stack on the modem processor or WLAN via tunneling; and
code for determining whether uplink packets received from the modem processor should be routed to at least one of WLAN via tunneling, or to a WLAN adapter for local breakout.

19. The computer program product of claim 18, wherein the code for the routing includes:
code for determining whether downlink packets decapsulated by tunneling should be routed to at least one of the one or more WWAN adapters towards an application on the applications processor, or routed to the modem processor towards another application on the modem processor.

20. The computer program product of claim 15, wherein the code for the determining the second access network includes:
   code for observing and being responsive to at least one of predetermined policies, dynamic policies received over the first access network, or a user selection asserted by a user of the UE.

21. The computer program product of claim 15, wherein the code for the handing off the data stream includes code for performing authentication and tunnel setup, and code for utilizing the APN associated with the data stream in the determined second access network in accordance with a General Packet Radio Service (GPRS) Protocol Tunnel (GPT).

22. A user equipment (UE) for wireless communication, the UE comprising:
   at least one processor; and
   a memory coupled to said at least one processor,
   wherein said at least one processor is configured to:
      identify a data stream on a first access network, wherein the data stream is associated with an access point name (APN), and the first access network comprises one of: a wireless wide area network (WWAN) or a wireless local area network (WLAN);
      determine a second access network different from the first access network for offloading the data stream, wherein the second access network comprises one of: the WWAN or the WLAN;
      hand off the data stream from the first access network to the determined second access network while maintaining Internet Protocol (IP) continuity by utilizing the APN associated with the data stream; and
      route packets of the data stream to the determined second access network in accordance with one or more of an operator policy or a user setting,
      wherein the UE has an applications processor and a modem processor, said modem processor having an IP flow Multi Access Packet Data Network Connectivity (MAPCON) engine that performs control functions for intelligent WLAN control, a WiFi monitor proxy that interacts with a WiFi monitor of the applications processor to receive WiFi related parameters that at least include WiFi signal quality, and an IP flow MAPCON policy manager that determines an access network among WWAN and WLAN,
      wherein an IP flow MAPCON radio access technology (RAT) manager of the IP flow MAPCON engine determines and selects an access network according to input from the WiFi monitor proxy and the IP flow MAPCON policy manager, and
      wherein the applications processor has an IP flow MAPCON engine proxy that interacts with the IP flow MAPCON engine to perform part of the handoff of the data stream initiated by an IP flow MAPCON handoff manager of the IP flow MAPCON engine, and an IP flow MAPCON router that routes packets to the determined second access network.

23. The UE of claim 22, wherein the WiFi monitor of the applications processor is further configured to scan and measure a WiFi signal, and the modem processor is further configured to receive, by the WiFi monitor proxy, scanning and measuring results from the WiFi monitor of the applications processor, and determine, by the IP flow MAPCON RAT manager., the second access network based on the WiFi signal strength and a threshold specified by a policy managed by the IP flow MAPCON policy manager.

24. The UE of claim 22, wherein the IP flow MAPCON policy manager of the modem processor has configured therein a set of policies on at least one of a per APN basis or a per IP-flow basis,
   wherein the set of policies are at least one of statically configured or dynamically downloaded from the first access network,
   wherein the set of policies define when and where the data stream associated with the APN should be routed over the second access network,
   wherein the modem processor is configured to determine the second access network based at least in part on the set of policies, and
   wherein the set of policies includes a policy of rerouting data streams of applications on the modem processor to WLAN via the applications processor whenever the WiFi signal quality exceeds a threshold, a policy of rerouting data streams of applications on the applications processor to WWAN via the modem processor only when the WiFi signal quality falls below another threshold, a policy of preventing rerouting of data streams from the applications processor to the modem processor in response to the user setting, and a policy of requiring rerouting of data streams from the modem processor to the applications processor in response to another user setting.

25. The UE of claim 22, wherein at least one of the modem processor or the applications processor is further configured to:
   determine whether uplink packets received from one or more WWAN adapters on the applications processor should be routed to at least one of a WWAN stack on the modem processor or WLAN via tunneling; and
   determine whether uplink packets received from the modem processor should be routed to at least one of WLAN via tunneling, or to a WLAN adapter for local breakout.

26. The UE of claim 25, wherein the at least one of the modem processor or the applications processor is further configured to:
   determine whether downlink packets decapsulated by tunneling should be routed to the one or more WWAN adapters towards an application on the applications processor, or routed to the modem processor towards another application on the modem processor.

27. The UE of claim 22, wherein the at least one processor is further configured to:
   determine the second access network responsive to at least one of predetermined policies, dynamic policies received over the first access network, or a user selection asserted by a user of the UE.

28. The UE of claim 22, wherein the at least one processor is configured to hand off the data stream by performing authentication and tunnel setup, and utilizing the APN associated with the data stream in the determined second access network in accordance with a General Packet Radio Service (GPRS) Protocol Tunnel (GPT).

* * * * *